UNITED STATES PATENT OFFICE.

CARLETON ELLIS, OF MONTCLAIR, NEW JERSEY.

CATALYZER FOR OIL-HARDENING AND PROCESS OF MAKING.

1,378,338. Specification of Letters Patent. Patented May 17, 1921.

No Drawing. Application filed December 30, 1919. Serial No. 348,329.

*To all whom it may concern:*

Be it known that I, CARLETON ELLIS, a citizen of the United States of America, residing at Montclair, in the county of Essex and State of New Jersey, have invented certain new and useful Improvements in Catalyzers for Oil-Hardening and Processes of Making, of which the following is a specification.

This invention relates to a catalyzer consisting of or comprising nickel or similar metallic material, for the hydrogenation of the unsaturated constituents of fatty oils, and to a method of producing same.

My invention consists in a catalyzer of base metals (non-noble metals) such as nickel material, particularly the free metal associated with another catalytic metal, and may be prepared from a solution or suspension of a salt of nickel in oil or other suitable vehicle. For example, the metal may be produced from a fatty soap of nickel, such as nickel oleate in a fatty oil vehicle, and a similar salt of another catalytic metal, by heating preferably in the presence of a reducing gas such as hydrogen, to form the active catalyzer material in an undissolved very finely divided state which preferably, in part at least, is in a collodial condition, that is, as an oil colloid.

It is not necessary to dissolve or fully dissolve the metallo-organic compounds in the oil as it is possible to add the material in such quantities as to more than saturate the oil, even if the compounds used are somewhat soluble therein, whereby less than the entire amounts of the said metallo-organic compounds would be dissolved. Decomposition (reduction) however, can be caused to take place in the raw material while suspended in the oil.

The process is readily applicable to the treatment of metallo-organic derivatives of the metals nickel, cobalt, copper and the like metals, and a particularly novel feature is the treatment of mixtures of compounds of several of such catalytic metals. Soaps of the metals are especially suitable for treatment by the process. As specific examples of the production of mixed metal catalysts, I cite mixtures of soaps (*e. g.* oleates) or other metallo-organic compounds, of both nickel and cobalt, and mixtures of soaps (*e. g.* oleates) or other metallo-organic compounds, of both nickel and copper. These mixtures of soaps, when dissolved in (or suspended in) the oil, and reduced by the process, may be made to produce highly active, finely-divided catalysts, which may in some cases be in the form of an oil-colloid.

The present application does not broadly claim the production of metal catalysts by thermal decomposition of metallo-organic bodies in oil, nor the products of such treatment, such subject matter being claimed in my patents: 1,251,201, December 25, 1917, 1,251,202, December 25, 1917, Reissue 14,429, January 29, 1918.

The present application is in part a continuation of my copending application 165,763 (as to the production, from organic metal salts or compounds, of mixed metal catalysts containing a plurality of the metals nickel, copper and cobalt). Application 165,763, in turn continued such matter from my copending application 50,462, for which application the present case is a substitute. Such application 50,462 is in part a continuation of my prior case 808,461, especially as to the reduction of organic compounds of a plurality of catalytically active base metal (non-noble metal) compounds.

I claim:

1. A process of making a finely-divided, highly active mixed metal catalyst, which comprises reducing, while carried in an oily vehicle, a mixture of metallic salts of a plurality of the metals nickel, copper and cobalt.

2. A process of making a finely-divided, highly active mixed metal catalyst, which comprises reducing, while carried in an oily vehicle, a mixture or organic acid salts of nickel and of copper.

3. A process which comprises liberating, in an oily vehicle, the metal content of a mixture of organic acid salts of nickel and of copper.

4. A new product comprising a plurality of the metals, nickel, copper and cobalt, in a finely-divided, catalytically active state, carried in an oily vehicle in such a finely-divided state that it will be maintained in suspension in the oil by gentle passage of hydrogen therethrough.

5. A new product comprising metallic nickel and metallic copper in a finely divided state, carried in an oil vehicle.

In testimony whereof I affix my signature.

CARLETON ELLIS.